US008824828B1

(12) United States Patent
Winn (10) Patent No.: US 8,824,828 B1
(45) Date of Patent: Sep. 2, 2014

(54) THERMAL V-CURVE FOR FUSION IMAGE DECLUTTER

(75) Inventor: Stuart Martin Winn, Salem, VA (US)

(73) Assignee: Exelis, Inc., McLean, VA (US)

( * ) Notice: Subject to any disclaimer, the term of this patent is extended or adjusted under 35 U.S.C. 154(b) by 253 days.

(21) Appl. No.: 13/432,439

(22) Filed: Mar. 28, 2012

(51) Int. Cl.
| G06K 9/40 | (2006.01) |
| G06K 9/00 | (2006.01) |
| G09G 1/14 | (2006.01) |
| G09G 3/28 | (2013.01) |
| G09G 3/30 | (2006.01) |
| G09G 5/00 | (2006.01) |
| G09G 5/02 | (2006.01) |
| G09G 5/10 | (2006.01) |
| G06K 7/10 | (2006.01) |
| G03G 5/16 | (2006.01) |

(52) U.S. Cl.
USPC ............ 382/274; 382/167; 382/172; 345/20; 345/63; 345/77; 345/581; 345/596; 345/690; 430/346; 430/944; 250/316.1; 250/271; 252/70

(58) Field of Classification Search
None
See application file for complete search history.

(56) References Cited

U.S. PATENT DOCUMENTS

| 3,806,633 | A | * | 4/1974 | Coleman .......................... 348/33 |
| 5,836,872 | A | * | 11/1998 | Kenet et al. ................... 600/306 |
| 5,854,851 | A | | 12/1998 | Bamberger et al. |
| 6,565,686 | B2 | * | 5/2003 | Bett et al. ......................... 156/64 |
| 6,850,282 | B1 | * | 2/2005 | Makino et al. ................ 348/371 |
| 6,870,955 | B2 | | 3/2005 | Lee et al. |
| 6,900,729 | B2 | * | 5/2005 | Paximadis et al. ............ 340/565 |
| 6,920,236 | B2 | * | 7/2005 | Prokoski ........................ 382/115 |
| 7,199,366 | B2 | * | 4/2007 | Hahn et al. ..................... 250/330 |
| 7,218,267 | B1 | * | 5/2007 | Weil ................................. 342/22 |
| 7,307,793 | B2 | | 12/2007 | Ottney et al. |
| 7,308,314 | B2 | * | 12/2007 | Havey et al. .................... 607/54 |
| 7,406,184 | B2 | * | 7/2008 | Wolff et al. ................... 382/118 |
| 7,436,568 | B1 | * | 10/2008 | Kuykendall, Jr. ............. 359/245 |
| 7,507,965 | B2 | * | 3/2009 | Lane et al. ................ 250/339.05 |
| 7,620,265 | B1 | * | 11/2009 | Wolff et al. ................... 382/276 |
| 7,620,269 | B1 | | 11/2009 | Nandy |
| 7,634,966 | B2 | * | 12/2009 | Pouliot et al. ................. 104/112 |
| 7,734,077 | B2 | * | 6/2010 | Hirsch et al. ................. 382/128 |
| 7,787,663 | B2 | * | 8/2010 | Hartlove ....................... 382/115 |
| 7,834,905 | B2 | * | 11/2010 | Hahn et al. ................... 348/148 |
| 8,494,227 | B2 | * | 7/2013 | Prokoski ........................ 382/115 |
| 2010/0290703 | A1 | * | 11/2010 | Sim et al. ...................... 382/172 |
| 2012/0123205 | A1 | * | 5/2012 | Nie et al. ...................... 600/109 |

OTHER PUBLICATIONS

Zin et al. "Fusion of Infrared and Visible Images for Robust Person Detection", Jan. 2011.*

(Continued)

Primary Examiner — Randolph I Chu
(74) Attorney, Agent, or Firm — RatnerPrestia (57) ABSTRACT

A method of fusing two images includes adjusting contrast of (a) a visual image and (b) a thermal image. Also included is modifying the adjusted contrast of the thermal image to form output brightness levels, by using a transformation curve, and then displaying both (a) the brightness levels of the thermal image and (b) the adjusted contrast of the visual image. Modifying the adjusted contrast of the thermal image includes using a V-curve as the transformation curve, in which the V-curve includes similar maximum output brightness levels at the coldest and hottest relative temperatures, respectively. The V-curve also includes a minimum output brightness level at a midpoint between the coldest and hottest relative temperatures. Furthermore, the method assigns different hues to the intensity values of the thermal image, ranging from coldest to hottest relative temperatures.

17 Claims, 9 Drawing Sheets

(56) References Cited

OTHER PUBLICATIONS

Matsui et al. "Image Enhancement of Low-Light Scenes with Near-Infrared Flash Images", 2010, ACCV 2009, Part I.*
Toet et al. "Merging thermal and visual images by a contrast pyramid", 1989, Optical Engineering 28(7), 789-792.*
Salamati et al. "Combining Visible and Near-Infrared Cues for Image Categorisation", 2011.*
Zhuo et al. "Enhancing Low Light Images Using Near Infrared Flash Images", 2010, IEEE 17th International Conference on Image Processing.*
Süsstrunk et al. "Enhancing the Visible with the Invisible: Exploiting Near-Infrared to Advance Computational Photography and Computer Vision", 2010, SID International Symposium Digest.*
Gyaourova et al. "Fusion of Infrared and Visible Images for Face Recognition", 2004, Computer Vision—ECCV 2004.*

* cited by examiner

REPLACEMENT SHEET

FIG. 8

THERMAL V-CURVE FOR FUSION IMAGE DECLUTTER

FIELD OF THE INVENTION

The present invention relates, in general, to fusion of two sensor systems. More specifically, the present invention relates to improving the viewability of two combined images seen through a night vision device.

BACKGROUND OF THE INVENTION

Night vision systems include image intensification, thermal imaging, and fusion monoculars, binoculars, and goggles, whether hand-held, weapon mounted, or helmet mounted. Conventional night vision systems are typically equipped with one or more image intensifier tubes to allow an operator to see visible wavelengths of radiation. The systems work by collecting the tiny amounts of light, including the lower portion of the infrared (IR) light spectrum, that are present but may be imperceptible to human eyes, and amplifying it to the point that an operator can easily observe the image. These devices have been used by soldier and law enforcement is personnel to see in low light conditions, for example, at night or in darkened buildings. These devices take ambient light, magnify the light and display the image for viewing through an eyepiece. A drawback of night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects, like trees or buildings. Since the primary source of infrared radiation is heat or thermal radiation, any object that has a temperature radiates in the infrared region.

Fusion systems have been developed that combine image intensification with thermal sensing. The image intensification information and the infrared information are fused together to provide a fused image that benefits over just image intensification or just thermal sensing. Whereas typical night vision devices with image intensification can only see visible wavelengths of radiation, the fused system provides additional information by providing heat information to the operator.

Fusion sensor systems attempt to show two images on top of each other. In the case of image intensified (I2) cameras and thermal (LWIR) cameras, they tend to show the I2 image in a green color (bright green=many photons; black=few photons) and the LWIR image in a warm color-like amber (very hot=bright amber; very cold=black).

Both sensors compete for visual space on every pixel of the display. This may create a cluttered image and a viewer may not be able to distinguish important details in one of the sensors, because it is drowned out by the visual information of the other sensor. One method of dealing with this clutter includes an overlay mode, which shows all of the I2 imagery but only the LWIR imagery above a predetermined threshold temperature. This, however, still has the problem of cluttering in the hot regions. Thus, fusion systems are frequently cluttered due to attempts to put data from two sensors into one image space.

As will be explained, the present invention improves the viewability of an I2 image and a thermal image which have been fused, or combined on a single display in a night vision device.

SUMMARY OF THE INVENTION

To meet this and other needs, and in view of its purposes, the present invention provides a method of fusing two images. The method includes the steps of:

(1) receiving intensity values of (a) a visual image and (b) a thermal image;

(2) adjusting contrast of the intensity values of (a) the visual image and (b) the thermal image;

(3) modifying, using a transformation curve, the adjusted contrast of the thermal image to form output brightness levels; and (4) displaying both (a) the brightness levels of the thermal image and (b) the adjusted contrast of the visual image.

Modifying the adjusted contrast of the thermal image includes using a V-curve as the transformation curve. The V-curve includes substantially similar maximum output brightness levels at coldest and hottest intensity values, respectively, and the V-curve includes a minimum output brightness level at a near midpoint between the coldest and hottest intensity values.

The method also includes the step of:

(5) assigning different hues, based on a hue-color wheel, to the intensity values of the thermal image, ranging from coldest to hottest relative temperatures. The coldest relative temperature is assigned a color of blue at 240 degrees of the hue-color wheel, and the hottest relative temperature is assigned a color of red at 0 degrees of the hue-color wheel. Ambient temperature is assigned a color of green at 120 degrees of the hue-color wheel.

The coldest relative temperature is modified by the V-curve to provide a maximum brightness level. The hottest relative temperature is modified by the V-curve to provide a maximum brightness level.

The step of displaying includes digitally fusing both (a) the brightness levels of the thermal image and (b) the adjusted contrast of the visual image, and subsequently displaying both.

It is understood that the foregoing general description and the following detailed description are exemplary, but are not restrictive, of the invention.

BRIEF DESCRIPTION OF THE DRAWINGS

The invention may be understood from the following detailed description when read in connection with the accompanying figures.

DETAILED DESCRIPTION OF THE INVENTION

The present invention, advantageously, realizes that the most critical thermal imagery for viewing is the very hottest information and the very coldest information. In addition, present invention assumes that the vast majority of a scene is near ambient temperature. As will be explained, temperatures are assigned hues, or colors, with ambient temperature assigned as green (which blends in with the I2 imagery). As the temperature becomes hotter, the hues vary through a rainbow of colors, from green to yellow, to orange, to red (hottest). As the temperature becomes colder, the hues vary from green to blue (coldest). It will be appreciated, however, that the aforementioned rainbow of colors is merely an example. The hues may take on other ranges of colors in representing any desired range of temperatures.

In an embodiment of the present invention, the brightness of the image in the thermal sensor also reflects a range of temperatures. Thus, the hottest image is represented as a very bright (hottest) image. Conversely the coldest image is represented as a very dark (coldest) image. The present invention, thus, uses both a range of hues (colors) and a range of intensities (brightness) to represent the pixels of a thermal image.

As further described below, the brightness value of each pixel is transformed, such that the middle value (or ambient value) is transformed to zero and the low and high extreme values are transformed to the maximum brightness level. The transform curve is shaped like a V-curve. The transform curve may also be shaped like a parabolic-curve, a log-curve, or an S-curve, as explained below.

Using the V-curve, S-curve, or log curve as a transformation in the present invention results in a better view of the fused image. The viewer may now see more critical regions of the I2 imagery with less obstruction from the thermal imagery. The pixels near ambient temperature are advantageously set to minimum brightness (or maximum darkness). The pixels that are hottest are set to the brightest level, and the pixels that are coldest are also set to the brightest level. It is the assignment of color or hue, by the present invention, to each pixel that allows the viewer to distinguish between the coldest (brightest) level and the hottest (brightest) level.

Prior to modifying the pixels of the thermal imager by using a brightness transformation as a function of temperature (namely, the V-curve, parabolic-curve, S-curve, or log-curve), the present invention applies a local area contrast enhancement process, which also modifies the brightness of every pixel on a local level of the image. Local area contrast enhancement effectively "pulls back" the brightness of large clusters of extremely hot pixels. This results in fewer pixels being noticeable within the hot cluster of pixels, thereby providing more contrast. For example, a human face, as a large cluster of hot pixels, now has sufficient contrast to recognize the individual.

In addition, since hue or color is also added, the color scheme selected by the present invention visually makes sense, since the scheme fits into commonly accepted notions of red being hot and blue being cold. Moreover, the scheme allows a brightness transform slope that is two times as steep as a 45 degree slope (for example, the conventional straight line shown in FIG. 2), so that details in the combined image may be better identified. Even in a region near ambient temperature (which is displayed as dark), there is more contrast information due to the steeper slope of the V-curve, as compared to the 45 degree slope.

Figure 1A:
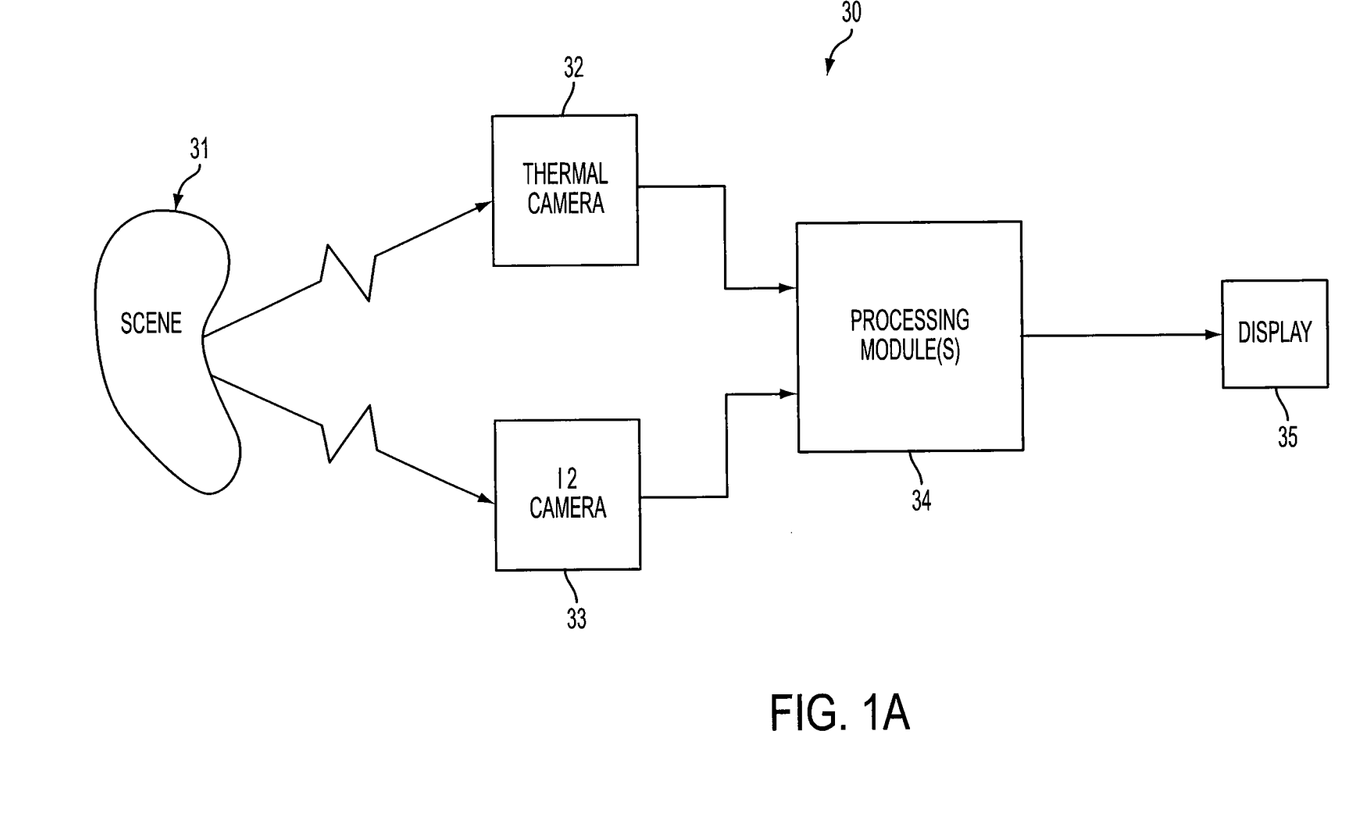
FIG. 1A is a fused system that combines an I2 image with a thermal image and includes processing modules, in accordance with an embodiment of the present invention.

Referring now to FIG. 1A, there is shown an embodiment of the present invention, which is a system for fusing thermal imagery in one channel with intensified (I2) imagery in another channel, the system generally designated as 30. The system 30 includes thermal camera 32, image intensified (I2) camera 31, processing module(s) 34 and display 35. As shown, both cameras (or sensors) capture scene 31, which may include objects of interest, or targets, and background information.

The targets may include, for example, one or more humans hiding in dense trees. Humans and hot objects, such as vehicles are considered targets herein, while dense trees or open fields may be considered background information. Various processing module(s) 34 receive the image data from the thermal camera and the I2 camera. The processing module(s), which may reside in one microprocessor or multiple microprocessors, execute a method of the present invention, as shown, for example, in FIG. 1B. The processing module(s) may also reside in an FPGA which may perform the parallel calculations required to maintain the desired frame rate and display size. The fused image is provided to a viewer by way of display 35. The display may include a micro-display, a projection display, or a helmet mounted display.

The two imagers included in fused system 30 use sensors that are different from each other, for example, the thermal camera uses IR detectors to generate an array of pixels and the I2 camera uses an image intensifier tube to generate another array of pixels. The two pixel arrays may have different sizes. In such case, processing modules 24 may decimate or magnify one pixel array, so that it matches the other pixel array. Alternatively, a portion of the larger pixel array may be ignored, so that it matches the smaller pixel array.

Since the two sensors operate in different regions of the electromagnetic spectrum, features that are not visible in one sensor may be visible in the other sensor. The present invention merges features in the I2 channel with features in the IR channel, as explained below.

Although shown as having a thermal sensor and an I2 sensor, it will be appreciated that the present invention may include other combinations of sensors. For example, system 30 may include an IR sensor and a camera operating in the visible electromagnetic range.

Figure 1B:
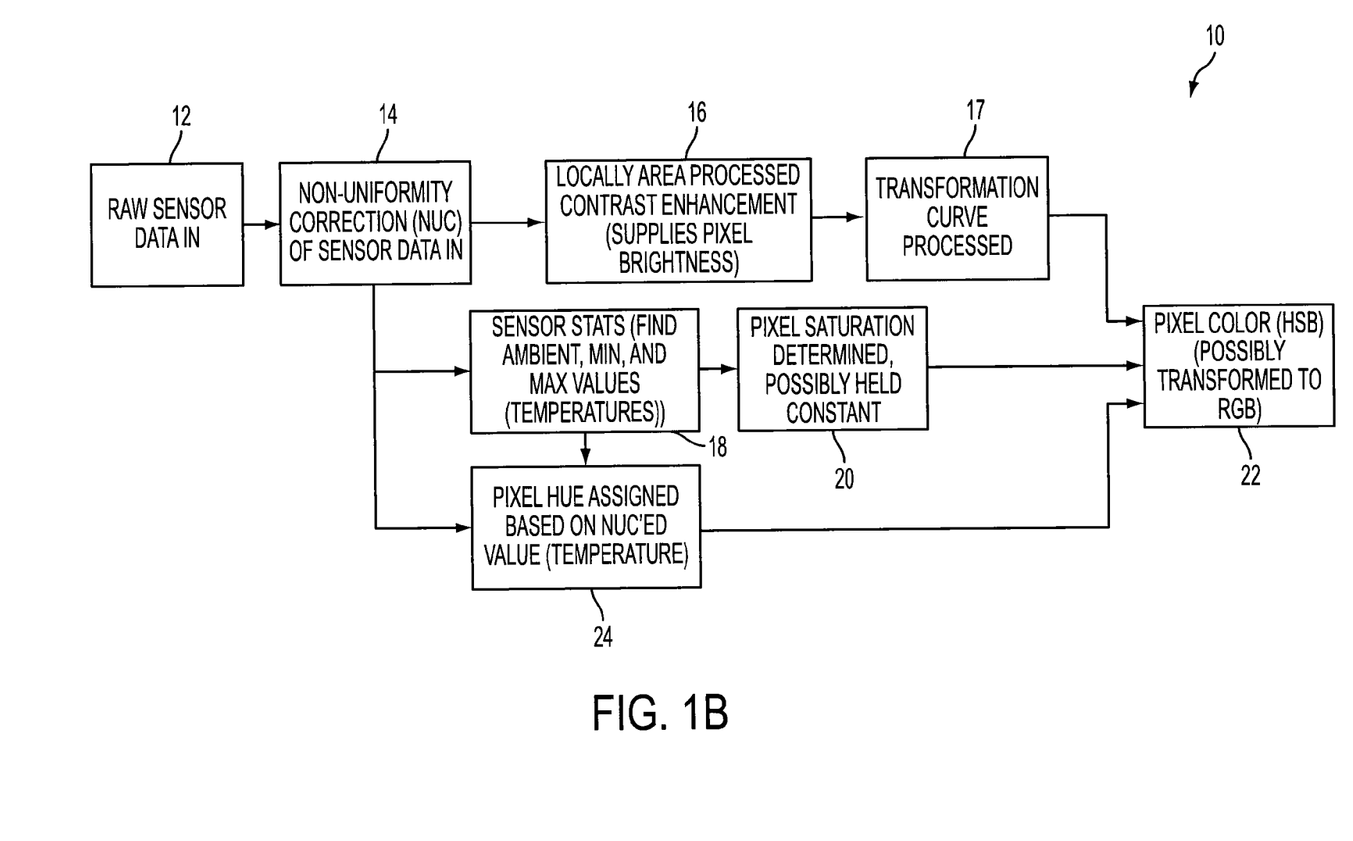
FIG. 1B is a block diagram of a method for applying a brightness transformation curve and color to imagery outputted by one of the sensors in the fused system of FIG. 1A, in accordance with an embodiment of the present invention.

Referring next to FIG. 1B, there is shown a method of the present invention, generally designated as 10. The method 10 is executed by processing module(s) 34 of system 30. As shown in FIG. 1B, raw sensor data is received in step 12. The raw sensor data is received in a single channel, for example, raw sensor data received from a thermal sensor (camera 32).

Step 14 receives raw sensor data and performs non-uniformity correction (NUC) on the received data. Step 16 performs contrast enhancement within local regions, or tiles of the image. Step 17 then applies a transformation curve (for example a V-curve) in order to modify the pixel brightness, as further explained below. Steps 18 and 20 determine sensor statistics, such as ambient temperature, minimum temperature and maximum temperature. The pixel saturation level is also determined. Step 24 assigns a hue (color) to each pixel of the image, after method 10 has completed non-uniformity correction of step 14. Step 22 displays the pixel color in HSB (hue, saturation, brightness) space, which may further be transformed into RGB (red, green, blue) space and then displayed.

The steps performed by method 10 will now be described in greater detail:

Various methods may be used by the present invention to correct non-uniformity in the received pixels (step 14). Generally, due to manufacturing issues, installation problems, material limitation and defects, a portion of the pixels in the array may not capture and correctly store their characteristic data. Some pixels may be considered good but may still need an adjustment to the stored data. Other pixels may be bad and may require replacement. Therefore, characteristic data of all the pixels in the array are adjusted by one or more correction components.

Typically, the array of pixels is tested and evaluated before field usage or product distribution to determine which of the correction components may need to be applied to the pixels. The correction components include a gain coefficient and an offset coefficient. The gain coefficient is a value that may be multiplied by the characteristic data in order to correct the data. In various embodiments, the gain coefficient may have a range of values from 0 to approximately 2. The offset coefficient is another value that may be added to the characteristic data to provide correction to each pixel. In various embodiments, the offset coefficient may have a range of values from approximately −512 to approximately 511.

Some pixels in the array may need their characteristic data corrected by the gain coefficients, some pixels may need their data corrected by the offset coefficients, some pixels may need their data corrected by both the gain coefficients and offset coefficients. If a pixel is good and needs no correction, for example, the gain coefficient may have a value of 1 and the offset coefficient may have a value of 0.

In general, an offset coefficient and a gain coefficient are applied to every pixel in the array, so that each pixel will respond to light uniformly. This process is known as non-uniformity correction (NUC) of a pixel. A method used to calculate the NUC offset and gain coefficients involves recording flat field images at various light levels Normally, two different light levels are selected and a pixel's response to the two different light levels is calculated as a slope and compared to the average slope of the entire sensor. Such method of calculating NUC gain coefficients is linear. Pixels, however, respond non-linearly to different light levels.

The present inventor discovered that less non-uniformity is observed at light levels near those used to calculate the NUC gain coefficients, but the error/non-uniformity of a non-uniformity corrected pixel may be quite dramatic at extreme ADU levels. The effect of this is that if the average video level of a scene is near the midpoint of the display range, pixels at the upper boundary of the display range may be displayed inaccurately, because the amount of gain applied is inappropriate for this video level. Accordingly, an improved method for non-uniformity correction of pixels in an imaging array has been disclosed by the present inventor in U.S. application Ser. No. 12/365,611, titled "Non-Uniformity Correction (NUC) Gain Damping," filed on Feb. 3, 2012, which is incorporated herein by reference in its entirety. It will be understood, however, that step 14 may be skipped by the present invention. In general, NUC processing is preferably applied to any digital sensor.

After NUC correction, the present invention performs contrast enhancement (step 16) which sets brightness levels for the pixels of the thermal sensor. Since the contrast enhancement affects local areas, or tiles in an image, the brightness of large clusters of "extreme pixels" are modified, so that these "extreme pixels" have sufficient contrast to distinguish one pixel from another pixel in the cluster. For example, hot pixels in a cluster, representing a human face, are contrast enhanced in step 16, so that the face may be recognizable. As another example, when images are taken in the presence of bright light, details in shadows and in bright areas are often lost. Likewise, details are often lost in dark areas of dark images. As another example, pixels clustered in the "middle" range of brightness may also be spread out in intensity, in order to improve visual appearance. As such, the visual appearance of an image may often be improved by remapping the pixel values to take advantage of the full range of possible pixel outputs. That procedure is called contrast enhancement.

Contrast enhancement techniques are often based on histogram equalization. In histogram equalization, a histogram of gray level distribution of an image is constructed. A histogram is a one dimensional array with an array element corresponding to each value in the range of pixel values. Each histogram element contains a count of the number of pixels that has the particular pixel value corresponding to that element. In histogram equalization, the pixel values in the image are altered to make the distribution of gray level values as uniform as possible.

One example of a contrast enhancement technique is disclosed by the present inventor in U.S. application Ser. No. 13/352,765, titled "Bias and Plateau Limited Advanced Contrast Enhancement," filed on Jan. 18, 2012, which is incorporated herein by reference in its entirety. Briefly, as described in that U.S. Application, local area processing (LAP) is applied, which calculates a histogram for each portion of an image. Thus, the image is divided, or partitioned into square tiles. A separate histogram is then calculated for each tile.

A histogram for each tile is calculated by placing the pixels in different bins, in which each bin represents a unique intensity value. In a 12 bit display, for example, the intensity value may vary between 0 and 4095 ($2^{12}-1$)ADU. There may be a bin for each possible intensity value; for example, there may be 4096 bins where each bin has an integer value. As another example, each bin may represent a range of intensity values; thus, if each bin includes a range of 64 ADU values, then the value of the first bin may be 0-63 ADU, the value of the second bin may be 64-127 ADU, and the value of the last bin may be 4032-4095 ADU. In this manner, a distribution of intensity values is obtained for each tile. This distribution may also be referred to herein as a probability distribution function (PDF).

Once a PDF (histogram) is obtained for each tile, a local transformation curve is calculated for each respective tile. In order to generate the appropriate transformation curve, a cumulative histogram (also called cumulative distribution function, or CDF) is calculated by accumulating the histogram values. The cumulative histogram may be normalized, such that a suitable transformation function for mapping the raw luminance levels into contrast enhanced levels is obtained.

Having corrected for non-uniformity of pixels (which includes correcting for bad pixels) in step 14, and enhancing contrast in local areas or tiles in step 16, method 10 enters step 17. As shown in FIG. 1B, step 17 processes yet another transformation on the received raw sensor data. This additional transformation uses a specific curve to modify the brightness levels of the image. This curve may include a V-curve (FIG. 2), a parabolic-curve (FIG. 3), a log-curve (FIG. 4), or an S-curve (FIG. 5).

Figure 2:
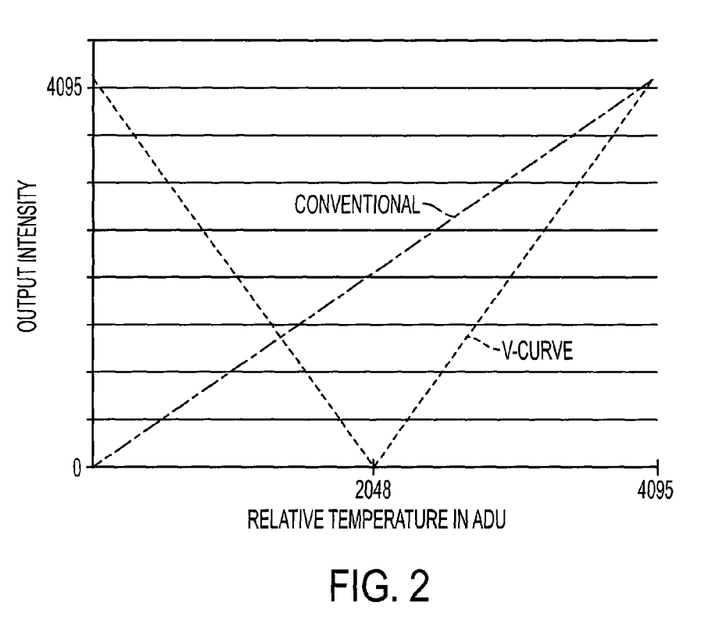
FIG. 2 is a plot of output intensity or output brightness (in ADU) versus relative temperature (in ADU) of pixels in a thermal sensor, depicting a V-curve transformation, in accordance with an embodiment of the present invention.

Referring now to FIG. 2, there is shown an example of a transformation curve as a V-curve. The curve shows output intensity in ADU (as an example) as a function of the relative temperature, expressed in ADU (as an example). As shown, 2048 ADU denotes ambient temperature. Zero (0) ADU denotes the coldest temperature and 4095 ADU denotes the hottest temperature. Accordingly, as the pixels of the sensor range between the coldest temperature (0 ADU) to the ambient temperature (2048 ADU), the brightness levels of the output are modified between 0 ADU to 4095 ADU, respectively. Moreover, as the relative pixel temperatures swing between ambient temperature (2048 ADU) and the hottest temperature (4095 ADU), the output intensity levels swing between 0 ADU and 4095 ADU. Thus, two slopes are provided that defines the V-curve. A first negative slope is provided, which decreases from 4095 ADU to 0 ADU, as the relative input temperature increases from 0 ADU to 2048 ADU; and a second positive slope is provided, which increases from 0 ADU to 4095 ADU, as the relative input temperature increases from 2048 ADU to 4095 ADU.

Using the V-curve, shown in FIG. 2, the present invention sets the pixels of the thermal imager, regardless of whether they are the hottest pixels or the coldest pixels, to the same maximum intensity level.

Figure 3:
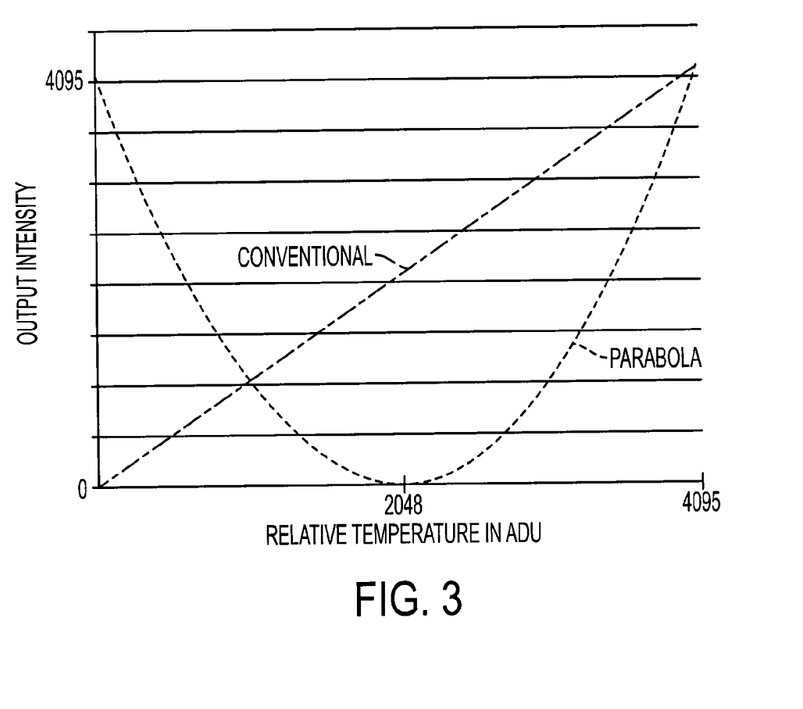
FIG. 3 is a plot of output intensity or output brightness (in ADU) versus relative temperature (in ADU) of pixels in a thermal sensor, depicting a parabolic-curve transformation, in accordance with an embodiment of the present invention.

FIG. 3 shows a parabolic-curve used for the brightness transformation in step 17 of the present invention. Similar to the V-curve, the parabolic-curve provides 0 ADU output at ambient temperature (2048 ADU). At the coldest temperature (0 ADU) and at the hottest temperature (4095 ADU), the present invention provides a transformed brightness of maximum output intensity (4095 ADU).

Figure 4:
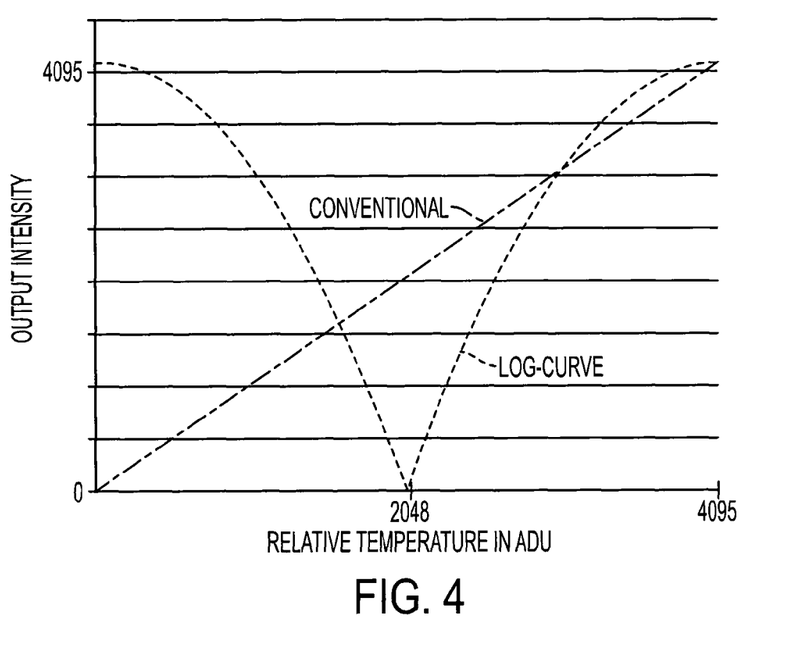
FIG. 4 is a plot of output intensity or output brightness (in ADU) versus relative temperature (in ADU) of pixels in a thermal sensor, depicting a logarithmic-curve transformation, in accordance with an embodiment of the present invention.
Figure 5:
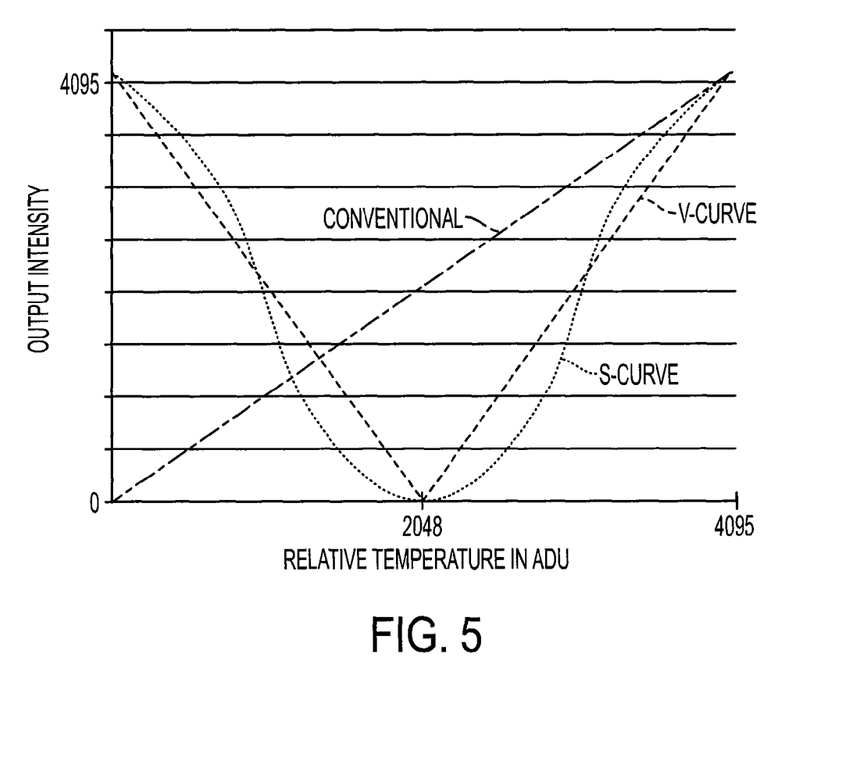
FIG. 5 is a plot of output intensity or output brightness (in ADU) versus relative temperature (in ADU) of pixels in a thermal sensor, depicting a V-curve transformation and an S-curve transformation, in accordance with an embodiment of the present invention.

Providing similar transformations of brightness in step 17, there are shown transformations using a log-curve and an S-curve, respectively, in FIG. 4 and FIG. 5. Each curve provides minimum output intensity (0 ADU) at ambient input temperature (2048 ADU), but maximum brightness (4095 ADU) at the coldest temperature (0 ADU) and the hottest temperature (4095 ADU).

Referring again to FIG. 1B, statistics for the thermal sensor are determined by step 18 and step 20. Accordingly, the ambient temperature for an image is determined. Furthermore, the minimum and maximum values for the temperature of the image are also determined. Since the brightness transformation curves shown in FIGS. 2-5 include two maximum points, one at cold temperature (0 ADU) and another at hot temperature (4095 ADU), the present invention uses colors or hues to distinguish between a cold temperature and a hot temperature. This is provided by step 24 which assigns a hue to each pixel. Thus, as shown in FIG. 6, each pixel is assigned a hue depending upon its relative temperature level.

Figure 6:
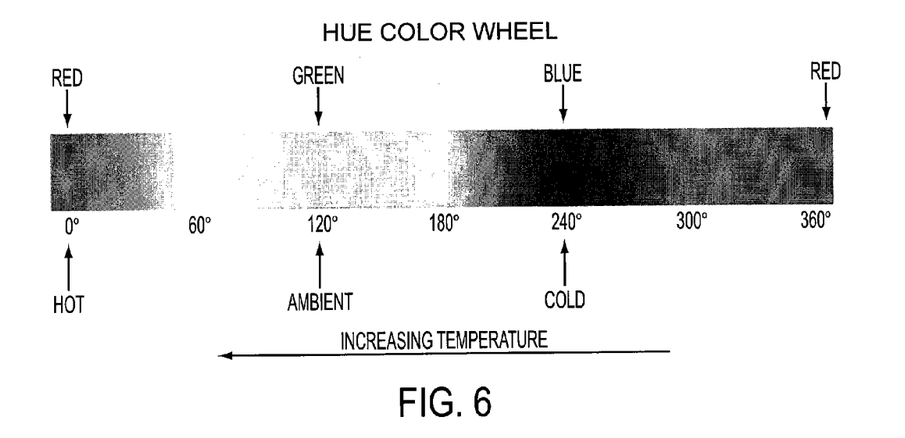
FIG. 6 is a depiction of a hue color wheel with temperature range superimposed on the wheel, in accordance with an embodiment of the present invention.

Examining a color wheel shown in FIG. 6, the present invention extends its hues from 0° of the wheel to 240° of the wheel. Accordingly, at 0° of the wheel the hue color is red, at 120° of the wheel the hue color is green, and at 240° of the wheel the hue is blue. Various gradations of hue color are provided which vary from red to green to blue.

Advantageously, it will be appreciated that the image intensifier (I2) sensor of the present invention provides a green hue on a display. Thus, using the hue color wheel of FIG. 6, and aligning it with the V-curve of FIG. 2, it will be understood that the 2048 ADU level is assigned the green color at 120° of the color wheel, the 0 ADU level is assigned the blue color at 240° of the color wheel, and the 4095 ADU level is assigned a red color at 0° of the color wheel.

Figure 7:
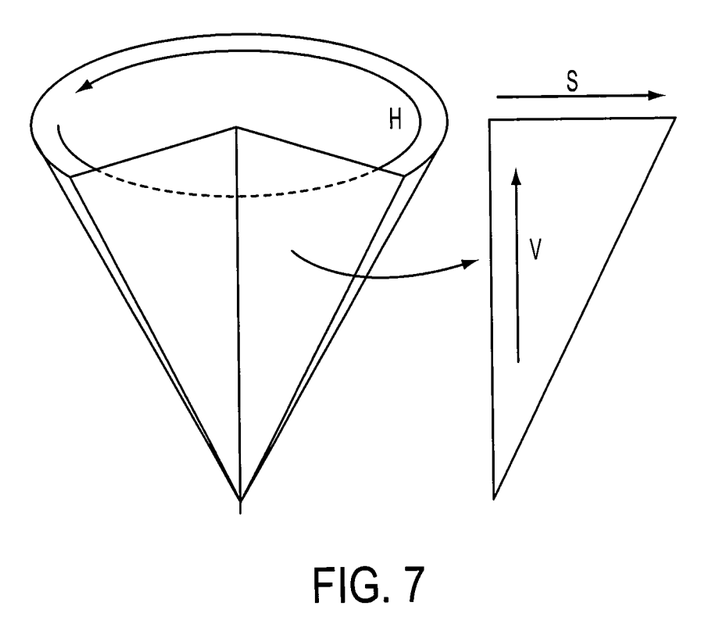
FIG. 7 is a three-dimensional (3D) representation of the hue color wheel in an HSB (hue, saturation, brightness) space.

Referring now to FIG. 7, there is shown a three-dimensional (3D) representation of the hue color wheel (shown as H forming an angle around the central vertical axis). The distance from the central vertical axis corresponds to saturation, or S. The distance along the central vertical axis corresponds to brightness, or B (shown as value, or V). These form an HSB color space, which is displayed by step 22 of FIG. 1B.

Figure 8:
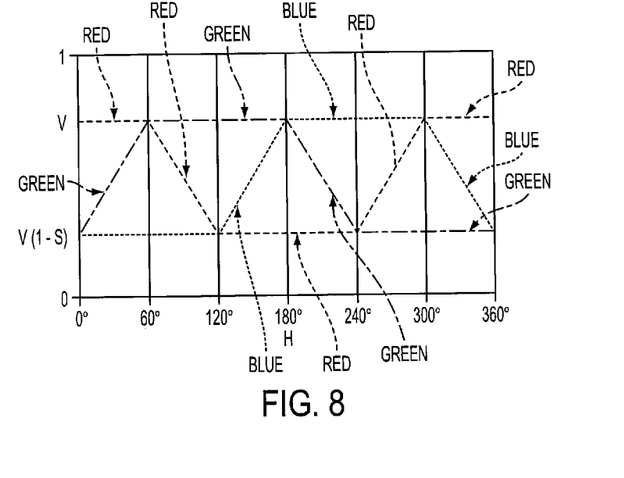
FIG. 8 is an illustration of the relationship between the hue of colors with maximal saturation in HSV (hue, saturation, value) space, including their corresponding RGB (red, green, blue) coordinates.

The HSV (or HSB) space is also shown in FIG. 8, which is an illustration of the relationship between the hue of colors with maximal saturation in HSV and with their corresponding RGB coordinates. As shown, the red primary starts at 0°, passes through the green primary at 120° and the blue primary at 240°; and then wraps back to red at 360°. In each geometry, the central vertical axis comprises the neutral, or gray colors, ranging from black at brightness 0 or value 0 (at the bottom) to white at brightness 1 or value 1 (at the top). In both geometries, the additive primary and secondary colors—red, yellow, green, cyan, blue, magenta—and linear mixtures between these adjacent pairs, sometimes called pure colors, are arranged around the outside edge of the cylinder with saturation at 1.

It will be appreciated that the present invention may be used in any thermal image sensor system. It may be used either stand alone or when fused with some sort of visible light (low light, night vision, SWIR, etc.). This fusion may be optically produces, or digitally produced.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of fusing two images comprising:
   receiving intensity values of (a) a visual image and (b) a thermal image;
   adjusting contrast of the intensity values of (a) the visual image and (b) the thermal image;
   modifying, using a transformation curve, the adjusted contrast of the thermal image to form output brightness levels; and
   displaying both (a) the brightness levels of the thermal image and (b) the adjusted contrast of the visual image;
   wherein
   modifying the adjusted contrast of the thermal image includes using a transformation curve,
   in which the transformation curve includes substantially similar maximum output brightness levels at coldest and hottest intensity values, respectively, and
   the transformation curve includes a minimum output brightness level at a near midpoint between the coldest and hottest intensity values.

2. The method of claim 1 including the step of:
   assigning different hues, based on a hue-color wheel, to the intensity values of the thermal image, ranging from coldest to hottest relative temperatures.

3. The method of claim 2 wherein
   the coldest relative temperature is assigned a color of blue at 240 degrees of the hue-color wheel, and
   the hottest relative temperature is assigned a color of red at 0 degrees of the hue-color wheel.

4. The method of claim 2 wherein
the coldest relative temperature is modified by the transformation curve to provide a maximum brightness level, and the hottest relative temperature is modified by the transformation curve to provide a maximum brightness level.

5. The method of claim 2 wherein
ambient temperature is assigned a color of green at 120 degrees of the hue-color wheel.

6. The method of claim 1 wherein
the step of displaying includes digitally fusing both (a) the brightness levels of the thermal image and (b) the adjusted contrast of the visual image, and subsequently displaying both.

7. The method of claim 1 wherein
modifying the adjusted contrast of the thermal image includes using a V-curve or the parabolic-curve as the transformation curve, in which the V-curve or the parabolic-curve includes substantially similar maximum output brightness levels at coldest and hottest intensity values, respectively, and the V-curve or the parabolic-curve includes a minimum output brightness level at a near midpoint between the coldest and hottest intensity values.

8. The method of claim 1 wherein
modifying the adjusted contrast of the thermal image includes using a log-curve as the transformation curve, in which the log-curve includes substantially similar maximum output brightness levels at coldest and hottest intensity values, respectively, and the log-curve includes a minimum output brightness level at a near midpoint between the coldest and hottest intensity values.

9. The method of claim 1 wherein
modifying the adjusted contrast of the thermal image includes using an S-curve as the transformation curve, in which the S-curve includes substantially similar maximum output brightness levels at coldest and hottest intensity values, respectively, and the S-curve includes a minimum output brightness level at a near midpoint between the coldest and hottest intensity values.

10. A system of fusing two images comprising:
a thermal imager for providing a thermal image,
a visual imager for providing a visual image,
a first contrast module for adjusting the thermal image to provide a contrast enhanced thermal image,
a second contrast module for adjusting the visual image to provide a contrast enhanced visual image,
a transformation module for adjusting the contrast enhanced thermal image to provide a transformed thermal image, and
a fusion module for combining the contrast enhanced visual image and the transformed thermal image,
wherein the transformation module is configured to adjust the contrast enhanced thermal image using a transformation curve, the transformation curve defined by two upper points and a lower point, in which the two upper points correspond to substantially similar maximum output brightness levels at coldest and hottest intensity input values, respectively, and the lower point corresponds to a minimum output brightness level at a midpoint between the coldest and hottest intensity input values.

11. The system of claim 10 including
a display for viewing the combined contrast enhanced visual image and transformed thermal image.

12. The system of claim 10 wherein
the visual imager includes a night vision camera, and
the thermal imager includes an infrared (IR) camera.

13. The system of claim 10 wherein
the transformation curve includes one of a V-curve, an S-curve, a parabolic-curve, or a log-curve, each curve defined by two upper points and a lower point, in which the lower point is positioned between the two upper points.

14. The system of claim 10 including
a hue-color module for assigning different output hues, based on a hue-color wheel, to the thermal image, varying from coldest to hottest relative input temperatures.

15. The system of claim 14 wherein
the coldest relative input temperature is assigned an output color of blue at 240 degrees of the hue-color wheel, and
the hottest relative input temperature is assigned an output color of red at 0 degrees of the hue-color wheel, and
ambient input temperature is assigned an output color of green at 120 degrees of the hue-color wheel.

16. A processor for executing the following steps:
receiving intensity values of (a) a visual image and (b) a thermal image;
adjusting contrast of the intensity values of (a) the visual image and (b) the thermal image;
modifying, using a transformation curve, the adjusted contrast of the thermal image to form output brightness levels; and
providing for display both (a) the brightness levels of the thermal image and (b) the adjusted contrast of the visual image
wherein
modifying the adjusted contrast of the thermal image includes using a V-curve as the transformation curve,
in which the V-curve includes substantially similar maximum output brightness levels at coldest and hottest intensity values, respectively, and
the V-curve includes a minimum output brightness level at a near midpoint between the coldest and hottest intensity values.

17. The processor of claim 16 including the step of:
assigning different hues, based on a hue-color wheel, to the intensity values of the thermal image, ranging from coldest to hottest relative temperatures.

* * * * *